United States Patent [19]

Peters et al.

[11] 4,290,417
[45] Sep. 22, 1981

[54] SOLAR HEAT SYSTEM USING GRAVITATIONAL CIRCULATION OF HEATED TRANSFER MEDIUM

[75] Inventors: Melville F. Peters, Livingston, N.J.; Walter T. Peters, Harbor Rd., East Dennis, Mass. 02641

[73] Assignees: Walter Todd Peters; Margot E. Peters, both of East Dennis, Mass.; Albert F. Kronman, Locust Valley, N.Y.

[21] Appl. No.: 58,741

[22] Filed: Jul. 18, 1979

[51] Int. Cl.³ .................................................. F24J 3/02
[52] U.S. Cl. ..................................... 126/434; 126/900; 165/104.17
[58] Field of Search ............... 126/436, 428, 434, 900, 126/433; 165/104 S

[56] References Cited

U.S. PATENT DOCUMENTS

| | | |
|---|---|---|
| 792,494 | 6/1905 | Bruckner . |
| 1,242,511 | 10/1917 | Bailey ................................ 126/434 |
| 2,230,917 | 2/1941 | Triana . |
| 2,707,593 | 5/1955 | Woodcock . |
| 4,031,879 | 6/1977 | Parham ............................... 126/440 |
| 4,047,518 | 9/1977 | Anderson ............................ 126/900 |
| 4,191,329 | 3/1980 | Geaslin ............................... 126/427 |

FOREIGN PATENT DOCUMENTS

| | | |
|---|---|---|
| 285021 | 7/1978 | Canada . |
| 2555430 | 6/1977 | Fed. Rep. of Germany ...... 126/900 |

*Primary Examiner*—Larry I. Schwartz
*Attorney, Agent, or Firm*—Albert F. Kronman

[57] ABSTRACT

A solar heating system in which the heating transfer medium is circulated from the heat absorbing member through the heat exchange area by means of gravitational forces which are augmented by the use of a transfer medium containing additives which change in state from fluid to gaseous as they move through the system. An emulsifying agent is also employed within the circulating fluid to prevent agglomeration of the additives. The use of one or more additives within the circulating fluid depending upon ambient conditions is disclosed.

9 Claims, 10 Drawing Figures

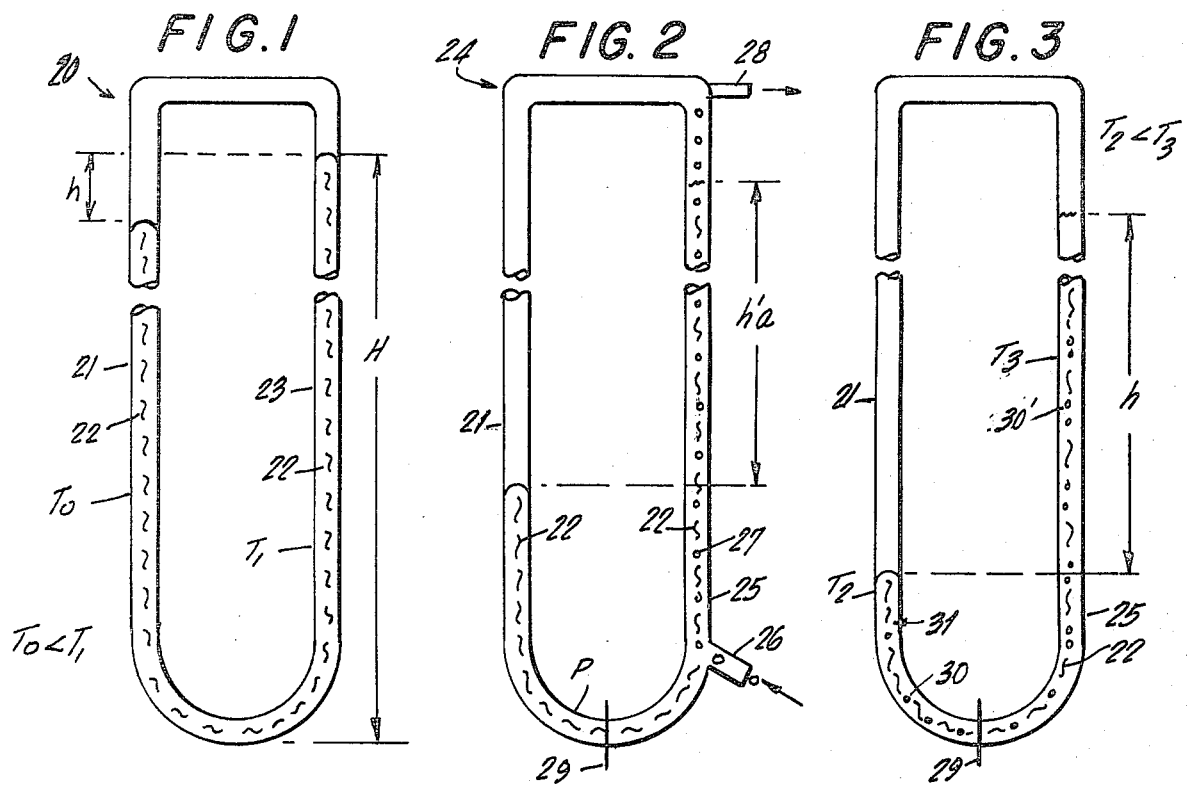
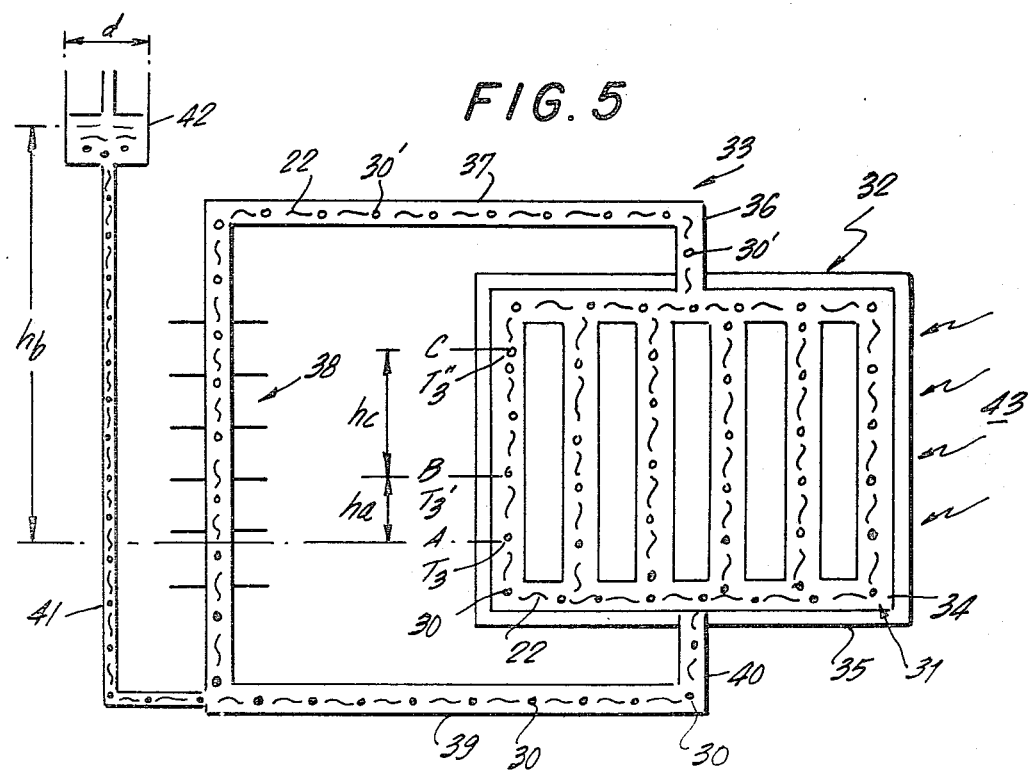

SOLAR HEAT SYSTEM USING GRAVITATIONAL CIRCULATION OF HEATED TRANSFER MEDIUM

FIELD OF THE INVENTION

This invention relates to a solar heating system which does not require pumps to circulate its heat transfer medium. More specifically, the invention concerns the circulation of fluids by gravity in a system and in particular to the circulation of fluids in heating systems using solar radiation to heat the circulating fluids.

The conventional method of using gravity to circulate the fluids in heating systems is to have two or more columns joined together at the top and bottom so as to form a fluid circuit, and to maintain one column in the system at a lower temperature than the other columns. Since the column at the lower temperature exerts a greater force at the base of the system than the columns at the higher temperatures, the fluids in the low temperature column will replace the warmer fluids in the other columns. If means are provided to maintain this temperature differential, the fluids will continue to flow from the low temperature column, through the bottom connection to the warmer columns, through the warmer columns to the upper connection and through the upper connection to the top of the low temperature column. The repetition of this cycle is called the circulation of fluids by gravity.

In solar heating, the simplest arrangement is to position the solar collector above the radiators, the transducers and the storage unit. In most installations, the collector is either at ground level or elevated and the other units are below or at the same elevation as the collector. With this arrangement of components it is common practice to use an electric fan or pump to circulate the fluid. However, the price of electricity will soon reach a value where the cost of circulating the fluids in the smaller solar energy systems with a fan or pump is not economically sound, when the electricity is purchased from the power company.

DESCRIPTION OF THE PRIOR ART

The prior art to which this invention relates and of which the applicant is aware is the disclosures of the following U.S. Pat. Nos. 2,230,917; 2,707,953; 3,999,389, 4,061,131; and 4,062,347. The first of these patents employs the phase change of ammonia heated by solar heat to operate a pump. U.S. Pat. No. 2,707,953 shows a phase change convection system using water and a vaporizable liquid capable of forming bubbles which move solar heated water through a radiator. U.S. Pat. No. 3,999,389 discloses a solar energy collector employing a closed energy conversion cycle utilizing alcohol as the conversion medium. U.S. Pat. No. 4,061,131 describes a system wherein heat from a solar collector is transferred to a volatile fluid within an evaporator which absorbs the heat with an increase in temperature and a change of state from liquid to vapor. Finally, U.S. Pat. No. 4,062,347 describes a system utilizing a solar collector on an exterior wall to heat a recirculating air mass in a vertical passage which causes the air to flow without the use of fans or blowers.

OBJECTS AND SUMMARY OF THE INVENTION

It is an object of the present invention to substitute or replace an electrically operated fluid pump in a solar heating system, by the gravitational force acting on fluids in different states.

It is a further object of the invention to introduce additives into the fluid which are in the gaseous state when they leave the collector and are in the liquid state in the other portions of the assembly.

It is an object of the invention to control the boiling point of the additive by controlling the fluid pressure in the system.

Another object of the invention is to control the operating temperature of the solar collector by controlling the fluid pressure.

It is an object of the invention to provide a fluid heating system using solar radiation to heat the fluid and the gravitational force to replace the fluid pump.

A further object of the invention is to use the intensity of the sun's rays to control the rate of flow of fluids through a solar heating system.

Still another object of the invention is to use the difference in density between fluids in the liquid and in the gaseous state to cause a column of fluid in the liquid state to displace columns of fluids in the liquid and the gaseous states.

The novel features which are believed characteristic of the invention, both as to organization and method of operation, together with further advantages thereof will be better understood from the drawings.

BRIEF DESCRIPTION OF THE DRAWINGS

In the drawings wherein the same reference characters refer to the same or like parts:

FIGS. 1-3 are somewhat diagragrammatic sectional views of a circuit showing the principle of the invention;

FIG. 5 is a diagrammatic view showing a simplified embodiment of the invention;

GENERAL DESCRIPTION

Figure 4:
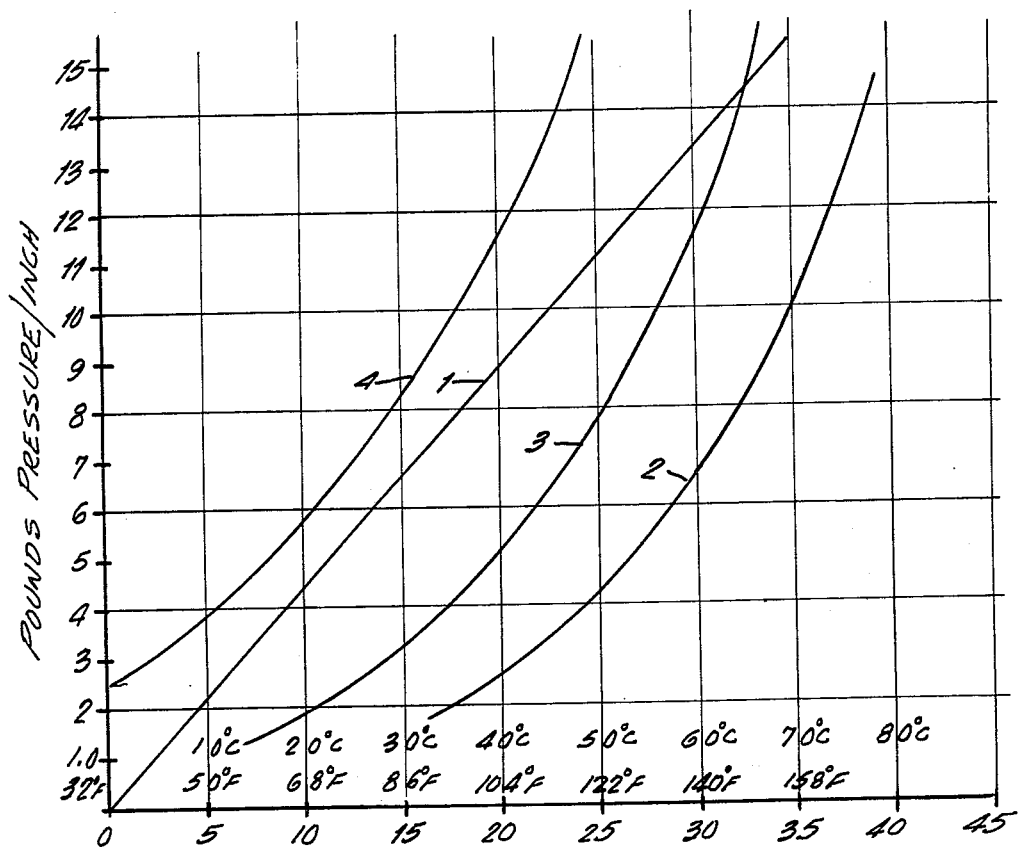
FIG. 4 is a graph, the curves of which show the pressure-temperature relationships for various heat transfer media.

The operation of the present invention is illustrated by way of reference to FIGS. 1-3 and 5. The closed U tube 20 in FIG. 1 consists of tube 21 containing Fluid 22 at a temperature $T_0$ and arm 23 containing like fluid at a temperature $T_1$, where $T_0 < T_1$. This temperature differential causes a difference in height h of the two columns, which may be computed for any liquid after values are assigned to $T_0$, $T_1$ and height H, from values similar to those given for the water-alcohol mixtures listed in table II.

Table I lists the density of a 5 percent mixture of ethyl alcohol and water (g./ml) over a temperature range 10° C. = 50° F. to 40° = 104° F.

TABLE I

| 10° C. | 15° C. | 20° C. | 25° C. | 30° C. | 35° C. | 40° C. |
| --- | --- | --- | --- | --- | --- | --- |

TABLE I-continued

| | | | | | | |
|---|---|---|---|---|---|---|
| 0.99098 | −032 | 0.98938 | −817 | −670 | −501 | −311 |

The closed U Tube 24 in FIG. 2 consists of arms 21 and 25 with an inlet 26 for blowing air into Tube 25 and an outlet 28 to allow the air to escape.

With the U tube partially filled with a fluid such as water 22, air 27 is blown into tube 25 through inlet 26. The air will pass upwards through the fluid in the form of bubbles and escape through outlet 28. During the passage of the air, which can be continuous, the weight of the water in tube 25 is directly proportional to the weight of the mixture of water and air.

The data in column 5 of Table II gives the pressure in pounds/inch$^2$ for columns of water one foot high for the temperatures listed in columns 1 and 2. For example, if water is placed in a U tube and one side of the tube is maintained at 10° C. and the other side maintained at 78° C., the pressure differential is only 0.0116 p.s.i. (0.4334−0.4218)/foot of height. Since the pressure differential is equal to the height of the column multiplied by the pressure differential/unit height, any pressure differential (and consequently the rate of flow of the fluid) can be obtained for a fixed temperature differential by increasing the height of the columns. For example, if the height of the water is increased to 32 feet the pressure differential is increased to 0.3712 p.s.i. (0.0116×32), which is sufficient to operate a hot water system without the aid of a fluid pump.

TABLE II

| (1) Temp. Deg. C. | (2) Temp. deg. F. | (3) Specific Gravity | (4) Density ft.$^3$ | (5) Wt./inch$^2$/ft. |
|---|---|---|---|---|
| 10 | 50 | 0.99973 | 62.4096 | 0.4334 |
| 20 | 68 | 0.99823 | 62.3164 | 0.4328 |
| 30 | 86 | 0.99567 | 62.1568 | 0.4316 |
| 40 | 104 | 0.99224 | 61.9428 | 0.4302 |
| 50 | 122 | 0.98807 | 61.682 | 0.4283 |
| 60 | 140 | 0.98324 | 61.380 | 0.4263 |
| 70 | 158 | 0.97781 | 61.041 | 0.4239 |
| 78 | 172.4 | 0.97307 | 60.745 | 0.4218 |

Blowing air into the fluid as illustrated in FIG. 2 is not practical for circulating fluids in a closed system unless a screening device is used to filter out the liquid as the air escapes through outlet 28. However, the same differential pressure can be produced in the two columns of fluid as shown in FIG. 3, if an additive 31' is added to fluid 22 in a finely dispersed solid or emulsified liquid state. These fluids are in the liquid state 30 at temperature $T_2$ and pressure P, and change into the gaseous state 30' at the higher temperature $T_3$ under the same pressure, where the temperature $T_2$ corresponds to the radiator temperature and $T_3$ the solar collector temperature, in a system utilizing the heat from the sun.

The data required to establish a solar collector temperature in terms of the height of the liquid above some designated horizontal plane passing through the collector is given in FIG. 4. The complete data for many substances are not given, but any substance which has a boiling point within the temperature range of the collector in terms of a permissible hydro-static head, will be suitable.

Curve 1 in FIG. 4 gives the p.s.i. versus hydrostatic pressure for water. Curves 2,3 give the pressure versus temperature over a temperature range for ethyl alcohol and methyl alcohol respectively. Curve 4 give the same pressure temperature relationship for carbon disulfide as curves 2,3 give for the alcohols.

This system substitutes two or more fluids having different boiling points at predetermined pressures. The pressures are contilled by either the height of a column of fluid, or in a closed system by an expansion tank (not shown).

Fluids suitable for this purpose are:

TABLE III

| Material (Additives) | Chemical Symbol | Pressure at degrees Fahrenheit | | |
|---|---|---|---|---|
| | | 1atm. | 2atm. | 5atm. |
| Methylamie | $CH_5N$ | 20.66 | 50.18 | 96.8 |
| 1-3 Butadiene | $C_4H_6$ | 23.9 | 59.54 | 116.6 |
| Butane | $C_4H_{10}$ | 31.1 | 65.84 | 122.0 |
| Methylbromide | $CH_2Br$ | 38.48 | 73.94 | 130.64 |
| Diemethylamine | $C_2H_7N$ | 45.32 | 77.0 | 129.02 |
| Ethylmethyl ether | $C_3H_8O$ | 45.5 | 79.7 | 137.48 |
| Ethylamine | $C_2H_7N$ | 61.88 | 96.26 | 149.54 |
| Methylformate | $C_2H_5O_2$ | 89.6 | 125.42 | 182.3 |
| Diethylether | $C_4H_{10}O$ | 94.28 | 132.8 | 194.0 |
| Ethanethiol | $C_2H_6S$ | 95.0 | 133.88 | 195.26 |
| Pentane | $C_5H_{12}$ | 96.98 | 136.40 | 198.32 |
| Acetone | $C_3H_8O$ | 133.7 | 173.48 | 235.4 |
| 2-3 Dimethylbutane | $C_6H_{14}$ | 136.4 | 179.6 | 248.54 |
| Ethyl propylether | $C_5H_{12}O$ | 143.06 | 185.54 | 253.58 |
| Methyl alcohol | $C_2H_4O$ | 148.9 | | |
| Ethyl alcohol | $C_2H_6O$ | 172.9 | | |
| Butyl alcohol | $C_4H_{10}O$ | 211.1 | 244.76 | 297.5 |

In order for the mixture of water and insoluble compounds to function as described in curve 4 in FIG. 5 it is necessary for the insoluble compounds to be in the form of emulsified particles in the water. To prevent the particles from combining to form large units it is necessary to add an emulsifying agent to the mixture. One well known emulsifying agent is soap, and one well known mixture of water, an insoluble hydrocarbon and an emulsifying agent, is water, gasoline and soap.

There are thousands of emulsifying agents or substances used to prevent instability of emulsified mixtures in cosmetics, food, aerosals, sprays and so on, and use of a particular emulsifying agent is not critical to this invention. The chief requirement for an emulsifying agent is that one part of the molecule of the agent be soluble in one of the liquids and the other part of the molecule be soluble in the other liquid.

The object of using emulsified insoluble liquids with boiling points below the boiling point of the carrier liquid, is that the low boiling point liquid, or liquids, will pass from the liquid state to the gaseous state when the solar absorber temperature reaches the boiling temperature of the insoluble liquids when subjected to pressure P. This will cause the column of liquids in the solar absorber to be partly in the liquid state and partly in the gaseous state and will have the same gravitational effect as if air were introduced into the column of liquids.

Referring to FIG. 5, there is shown a fluid heating system 33 using solar radiation 43 to heat the fluid in collector 32. This temperature differential between collector 32 and radiator 38 allows the gravitational force to replace the fluid pump. The collector 32 consists of a plurality of tubes 34 secured to a metal plate 35. The distance between the tubes and the plate thickness is chosen such that the initial and operational costs will be minimal.

The circulating fluid 22, such as water (which has a relatively high boiling point) contains additives 31. The additive must have a lower boiling point than fluid 22 and may be soluble (alcohol) or insoluble (gasoline) or some of the other compounds mentioned. Both tubes 34 and plate 35 are covered with photon absorbing material such as nickel black. The solar absorber tubes 34, header pipe 36, line 37, heat exchange radiator 38, return line tube 39, and return pipe 41 is connected to the lowest part of the system, which in the Figure is return line 39. A cylindrical container 42 of diameter d is connected to the upper end of stand pipe 41. The height $h_b$ will determine the temperature at which the additive 31 will pass from the liquid to the gaseous state 30'.

As the intensity of the sun's rays 43 increases and decreases, the height $h_b$ will increase and decrease, since the greater the intensity of the sun's rays, the sooner the fluid in the absorber will reach the boiling point. Thus, with an intense sun, the additive 31 will reach its boiling temperature $T_3$ at A, with average intensity produced by some clouding, the additive will not reach its boiling temperature $T_3$, which is less than $T_3$, until it reaches some higher elevation indicated by B. This lowering of the boiling point at B from $T_3$ to $T_3$, is caused by a decrease in the electrostatic head from $h_b$ to $h_b - h_a$.

The boiling temperature will be reduced to $T_3''$, where $T_3''$ is less than $T_3'$ and indicated in FIG. 5 at elevation C. Here the boiling temperature $T_3''$ of the additive is determined by the hydrostatic head $h_b - (h_a + h_c)$.

Assume the temperature of additive 31 is $T_3$ when it has the fluid head $h_b$ at A, where $T_3' < T_3$. Since the hydrostatic pressure $h_b$ is greater than the boiling pressure at temperature $T_3'$, the additive will remain in the liquid state. As the temperature of the fluids in collector 32 is greater than the temperature of the fluids in radiator 38, the fluids in the hydraulic circuits will slowly circulate. As additive 31 slowly rises, its temperature will increase and the hydrostatic pressure will decrease until the additive reaches $B_1$ where the boiling pressure at temperature $T_3'$ will equal the hydrostatic pressure $h_b - h_a$, and additive 31 which is in the liquid state will pass into the gaseous state 30'. This change in state of additive 30 will cause an increase in the rate of circulation of the fluids in the system, but its rate will be less than the change in rate that would take place if the change occurred at A.

If cloudy conditions delay the change of state of additive 31 until it reaches level C, the rate of fluid flow through the system will be less than if the change of state in the additive 31 took place at B. From this it follows that the intensity of the sun's rays will control the rate of flow of the fluids in the system.

The storage space for a small installation using water for storing solar energy should have a capacity of about 1500 gallons and the capacity of the remainder of the system should not exceed 200 gallons. If the minimum temperature of the 1700 gallons of water is approximately 77° F. ~ (25° C.) and the maximum temperature is 150° F. ~ (65.5° C.), the change in volume of the 1700 gallons of water would be $1700 \times 40.5 \times 0.007 = 482$ gallons $= 64.4$ cubic feet.

Since the change in pressure depends upon the head ($h_b$) and since it is this head which determines the boiling point of the additives at A, it is necessary to limit the change ($h_b$) as the water in the system undergoes this 40.5° C. temperature change. Assuming a change of ± one foot in height can be tolerated, the diameter d of the cylinder 42 illustrated in FIG. 5 will be $$d = 2r = 2 \times 4.53 = 9.06 \text{ feet} = 2\sqrt{64.4/\pi}$$

Figure 6:
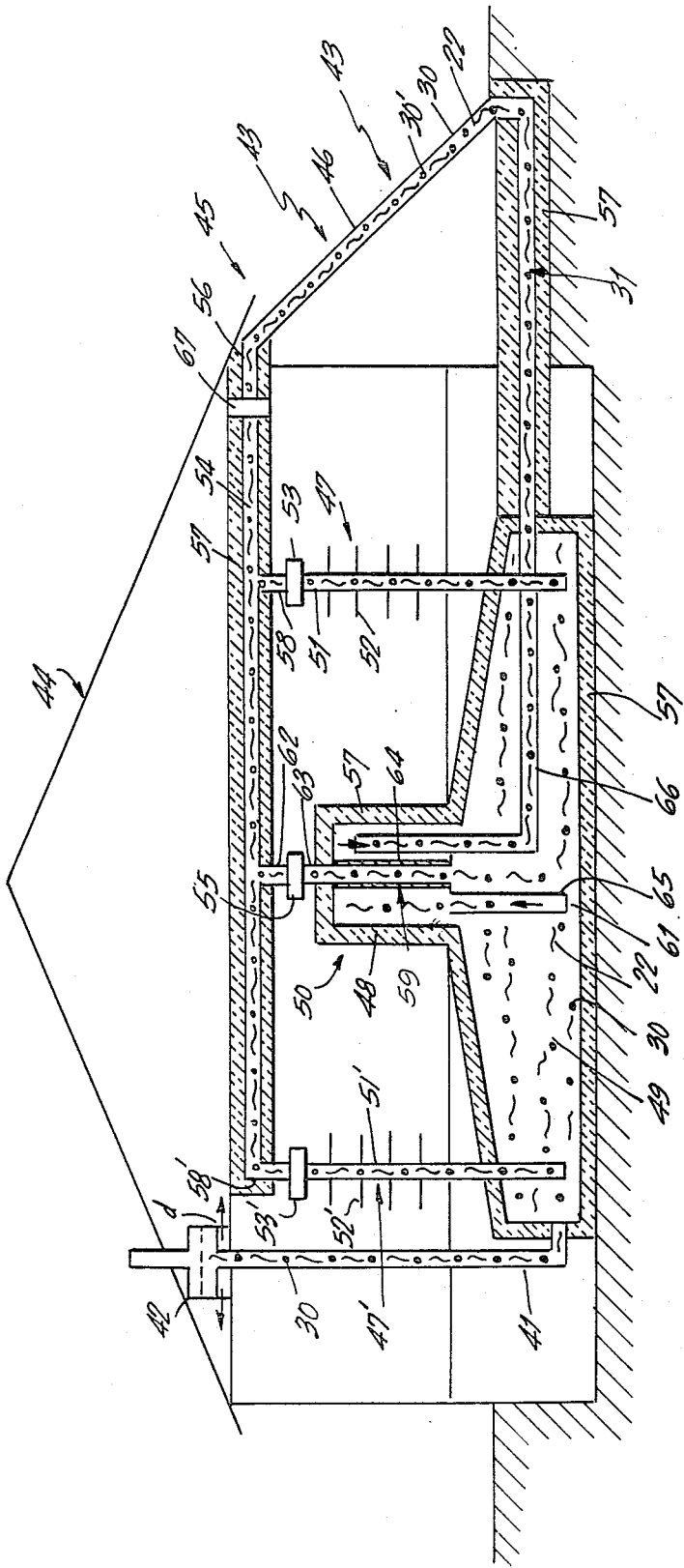
FIG. 6 is a somewhat diagrammatic sectional view of a house heating system.

FIG. 6 illustrates a solar heating unit 45 consisting of solar collector 46, radiators 47, 47', a heat exchanger 50, and a storage tank 49 located at an elevation below the solar collector 46, all arranged to supply heat to dwelling 44.

Figure 7:
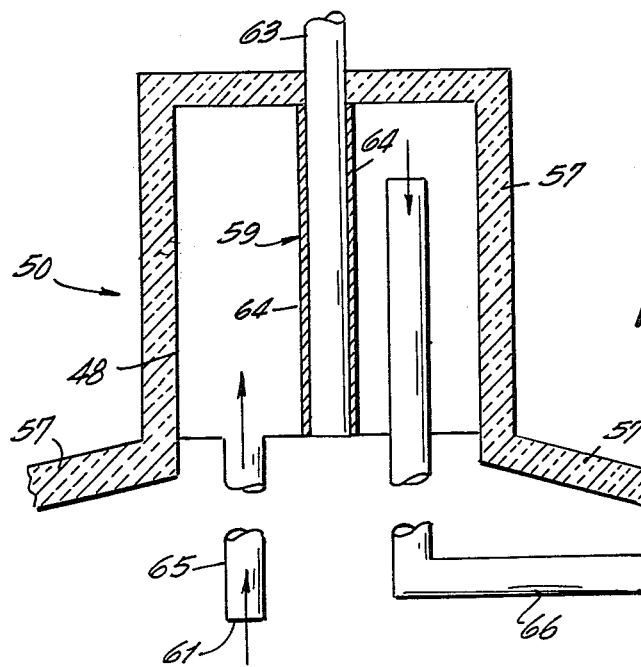
FIG. 7 is an enlarged diagrammatic sectional view of a heat exchanger for the system.

Collector 46 may be a plate, plate-tube, or a trough. The specific design of these collectors is not critical. The two radiators 47, 47' may be vertical or horizontal, the preferred shape consisting of vertical tubes 51 51' with fins 52 52' respectively, to increase the rate of heat loss. Tube 54 has one end connected to valve 67 which is connected to solar collector 46 through tube 56. The other end of tube 54 is connected to tube 58'. Valve 53' is placed between tube 58' and tube 51' of radiator 47'. A branch connection is made between tube 54 and radiator 47 through tube 58 and valve 53. Another branch connection is made between tube 54 and heat exchanger 50 through tube 62 and valve 55. Valves 53, 53', 55 and 67 are thermostatically controlled in accordance with the temperature of the fluids in the system. Condenser tube 59 of heat exchanger 50 (an enlarged drawing of which is shown in FIG. 7) consists of two sections, a short upper section 63 which is a poor conductor of heat connected to valve 55 and a lower section 64 which is a good conductor of heat. The housing 48 of the heat exchanger 50 has a tube 65 extending to the bottom of the storage tank 49 with an inlet 61. The only entrance to exchanger 50 is through tube 65. A stand pipe 41 is provided with an expansion chamber 42 of diameter d, where d is large enough to maintain the hydrostatic head of the water in the system to within ±1 foot or less, when the liquids in the system undergo their maximum permissible temperature change. Tube 54, exchanger 50, storage tank 49 and return tube 66 between exchanger 50 and solar collector 46 are covered with insulating material 57.

Solar radiation 43 acting on liquids 22,30, will change additive 31 from the liquid state to the gaseous state 30'. Assume, first, that valves 67, 53, 53' are open and valve 55 is closed, since the density of the liquid-gas mixture in collector 46 is less than the density of the liquid in radiators 47, 47', the fluids will flow from collector 46, through tube 54, through radiators 47, 47' into storage tank 49. To complete the fluid circuit with valve 55 closed; liquids 22, 30 will flow up through tube 65 into heat exchanger 50, into return tube 66 and on into the solar collector 46.

In order for the fluids to flow in this circuit it is necessary for the radiators to condense the liquid additive 30 from the gaseous state 30' to the liquid state 30. This makes the density of the liquids in the radiators greater than the fluids in the solar collector, and this difference in density will cause the gravitational force to circulate the fluids through the radiators.

Assume the temperature in the house is high enough to close valves 53, 53' and open valve 55. To be sure the fluids circulate between the solar collector 46 and storage tank 49 it is necessary to condense all fluids in condenser tube 59 which are in the gaseous state. This is done by having the tube 64 a good conductor of heat. The cooled liquid from the bottom of storage tank 49 will flow up through tube 65 to the other surface of tube 64 before it enters the return condenser tube 66, thus causing heat to flow through the walls of 64 into the circulating fluid. After the fluid leaves the exchanger 50, it flows through condenser tube 66, solar collector 46, tube 56, valve 67, tubes 54,62, valve 55, tube 63, condenser tube 64 and into the upper part of the storage tank 49. Thus cold liquid is withdrawn from the bottom of tank 49, preheated in heat exchanger 50, conducted through return condenser tube 59 to the collector 46 where it is heated by solar radiation and returned to the upper portion of tank 49. This circulation of liquid will continue until the temperature of the fluids entering exchanger 50 from the solar collector is equal to that of the fluids entering the collector. When these two temperatures are equal, the flow of fluids will stop, since the flow can not take place by the gravitational force unless the density of the fluids in collector 46 is less than the density of the liquids in the heat exchanger 50, and when the densities in tank 49 and collector 46 are equal, the fluids throughout the system are at a uniform temperature.

Assume the temperature in the house 44 is below a predetermined temperature and the fluids in the collector 46 are below the temperature of the fluids in the storage tank. The valves 53, 53', 55 will open and valve 67 will close. Since the temperature in radiators 47, 47' is below the temperature of the liquids in the upper portion of the storage tank and the temperature in exchanger 50, the gravitational force will cause the fluids to circulate between the radiators and the storage tank 49.

Figure 8:
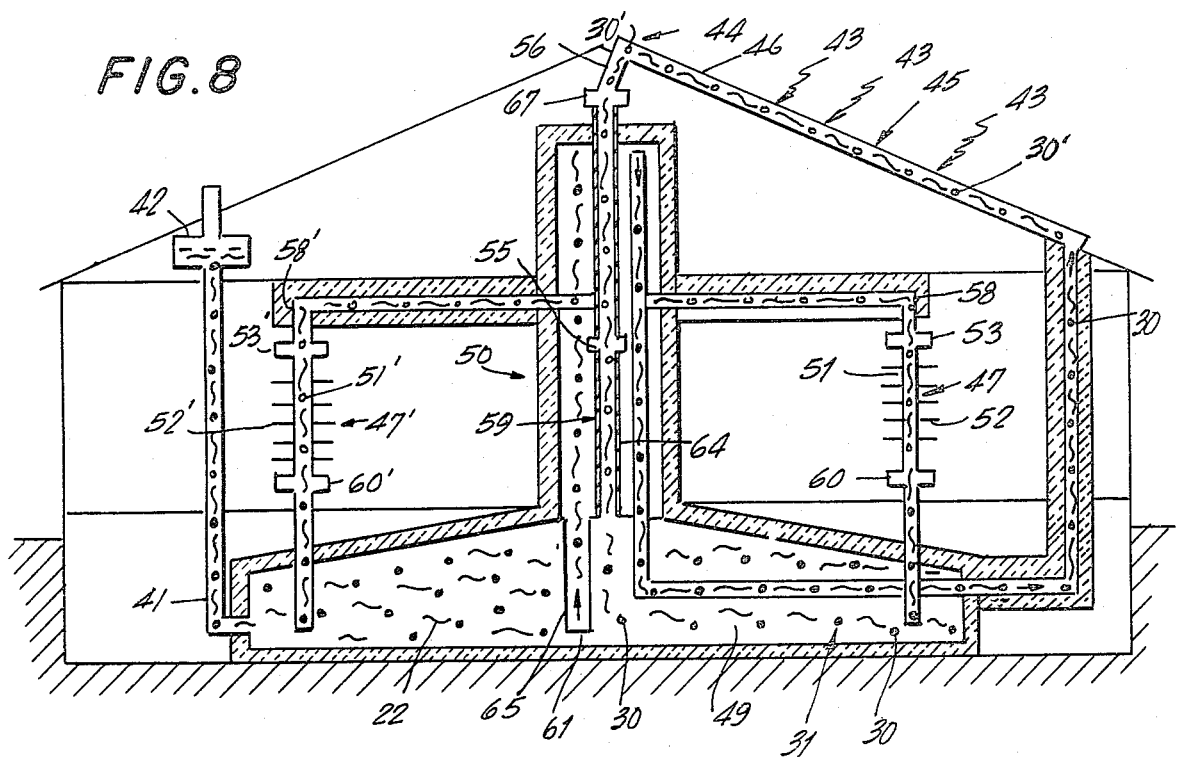
FIG. 8 is a diagrammatic sectional view of another embodiment of the invention.

FIG. 8 illustrates a solar heating system similar to the system illustrated in FIG. 6. Since the difference in elevation between solar collector 46 and storage tank 49 is much greater when the collector is on the roof rather than on a part of the wall as in FIG. 6, it may be desirable to use small fluid pumps 60, 60' to circulate the liquids in radiators 47, 47' respectively, when all the thermal energy supplied to the radiators is taken from storage tank 49. This circulation takes place between storage tank 49 and radiators 47, 47' when valve 67 is closed and valves 55, 53, 53' are open. The pumps, however, will be relatively small, since they are circulating fluids from the high temperature columns to the low temperature columns.

When radiators 47, 47' are receiving all the thermal energy which collector 46 absorbs from the sun, valves 53, 53', 67 are open and valve 55 is closed.

If part of the energy delivered to collector 46 by the sun is delivered to radiators 47, 47' and part to tank 49, valve 67 will be wide open and valves 53, 53', 55 will be partly closed.

When all the thermal energy delivered to collector 46 by the sun is used to heat storage tank 49, valves 55, 67 will be open and valves 53, 53' closed.

All the valves are thermally operated and are well known in the art. They are not part of this invention.

Figure 9:
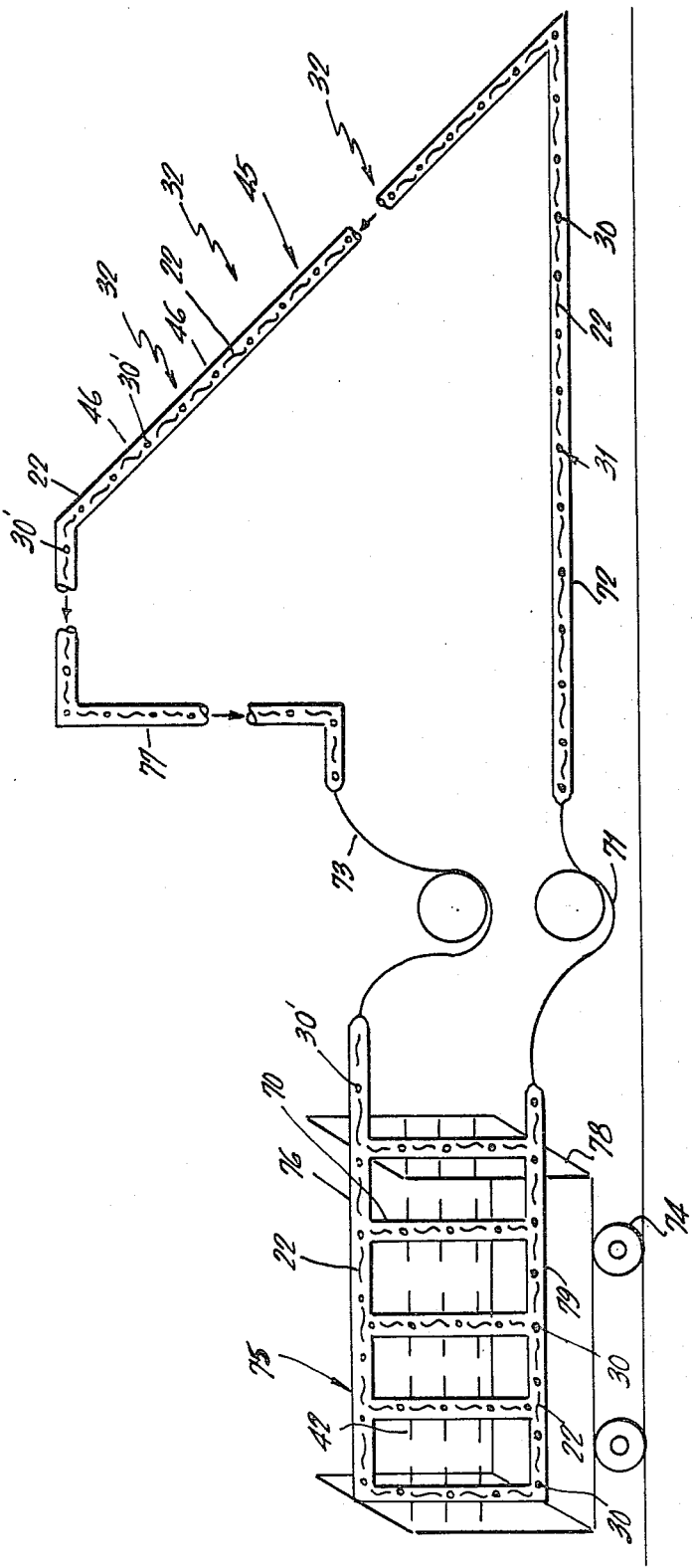
FIG. 9 is a diagrammatic sectional view of a portable version of the invention.

The assembly in FIG. 9 illustrates a radiator which may be transported from room to room or from station to station and, in this respect, has the same mobility as an electric heater when positioned near a window.

Radiator 75 consists of a plurality of tube 70 having their upper ends joined to a header 76 and their lower ends joined to a conduit 79. The radiator 75 consisting of tubes 70, header 76, and conduit 76 is mounted on cart 78 with wheels 74. Liquids and additives 22, 31 entering solar collector 46 is converted into vapor 30' after which the liquid 22 and vapor are conducted through line 77 and flexible hose 73 into radiator 75, where vapor 30' 3' is condensed into liquid 30. Liquids 22, 30 flow from the radiator into flexible hose 71 into return pipe 72 and into the lower part of collector 46. This completes the fluid cycle.

Figure 10:
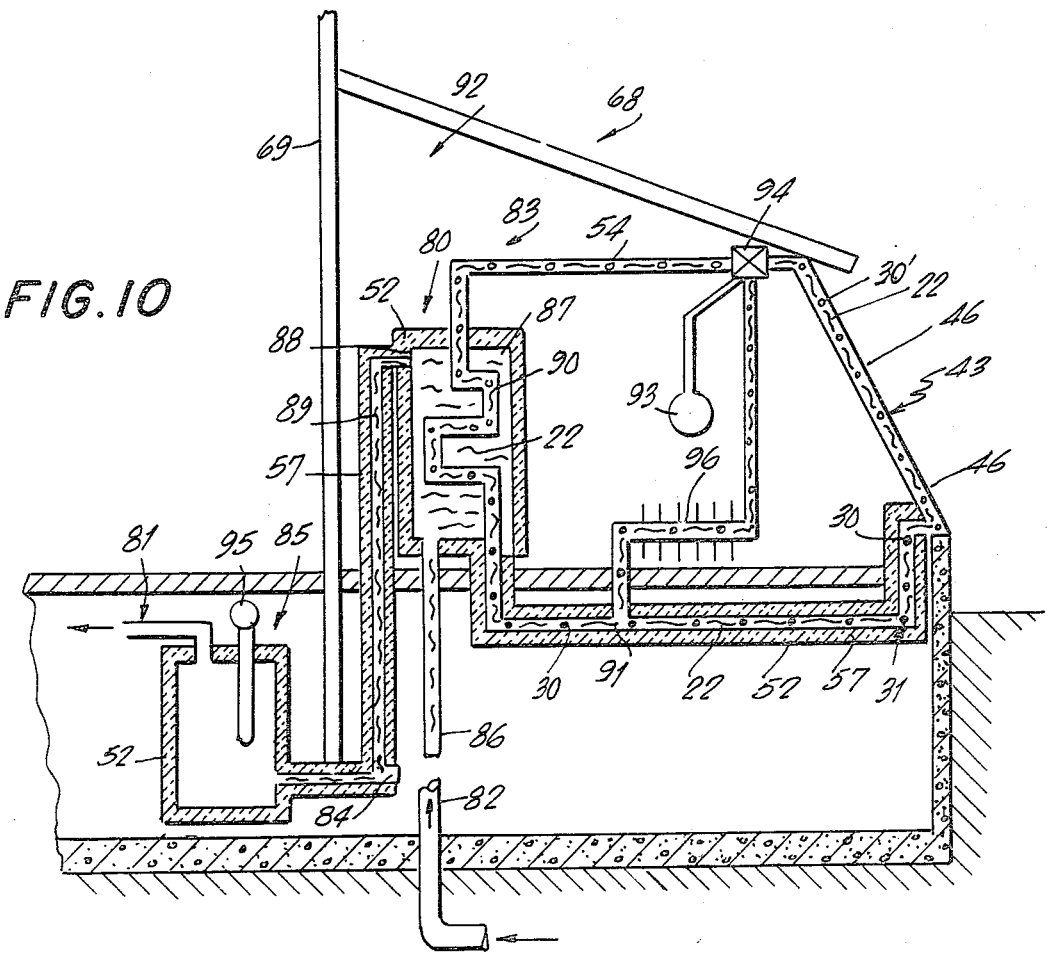
FIG. 10 is a diagrammatic sectional view of a hybrid system combined with a conventional water heater.

Referring now to FIG. 10, there is shown an annex 68 attached to dwelling 69. A radiator 96 uses the excess energy for heating the annex, where the size of the collector 46 and lack of space does not justify the expense of a storage unit. The solar hot water heater 80 is made a part of the conventional hot water system in dwelling 69 by disconnecting in inlet water pipe 82 from inlet 84 of hot water tank 85 and connecting it to the inlet pipe 86 of solar hot water tank 87 followed by connecting outlet 88 of solar hot water tank 87 to inlet 84 by means by pipe 89.

The conventional water heater consists of an electric or gas heater 95 and the hot water is conducted to the plumbing throughout the dwelling through Lines 81.

The solar unit 83 consists of solar collector 46, tubes 54 which conduct the heated fluids 22, 31 from the solar collector to coil 90, through coil 90 to pipe 91, and through pipe 91 back to solar collector 46. The fluids 22, 30 passing through coil 90 heat water 22 in solar hot water tank 80. When the temperature in the annex 92 drops below a predetermined value, thermostat 93 will cause valve 94 to divert the water from collector 46, from solar hot water tank 80 to radiator 96.

When the thermostat is set at low, the unit will serve as a hot water heater and when set for high the unit will heat the house. When all the energy from solar collector 46 is passed through radiator 96, the water from the city mains will pass through solar hot water tank 80 before it enters heater 85. Under the worst conditions, the water entering heater 85 from tank 80 can be at lower temperature than if it entered heater 85 directly from the city mains from pipe 82.

A proper selection of the carrier fluid and one or more additives depends upon the two extreme temperatures and the two extreme pressures at which the system will operate. By extreme temperatures is meant the lowest temperature at which the vapor pump initiates an efficient circulation of the fluids and the maximum temperature is the highest temperature reached by the circulating fluids in the solar absorber on a sunny day. By extreme pressure is meant the minimum pressure in the system when all fluids are at their lowest temperature and the maximum pressure is the highest pressure the system can safely withstand.

The principle carrier fluid must satisfy two factors, first it must not undergo a change in state when the system is subjected to the lowest ambient temperature and second it must not boil at the highest temperature under normal operating pressures. The second condition is necessary since the carrier will consist of a fluid fortified with an additive to prevent it from undergoing a change in state at its lowest temperature.

To prevent this change in state at these low temperatures it is often necessary to include a large amount of additive to the carrier fluid. If all this additive were vaporized at temperatures equal to or below the average operating temperature of the system the volume of vapor produced would be great enough to blow all of the liquid out of the system, or if the system were sealed, to produce dangerously high pressures. For example, if water were the carrier fluid and sufficient ethyl alcohol added to prevent freezing at 20° F., the system could be safely operated with a solar collector receiving direct radiation from the sun, since at 212° F., the boiling point of water, the vapor pressure of ethyl alcohol is only 2.27 atmospheres. However, it would be dangerous to add an unlimited amount of the additives listed above ethyl methyl ether in Table III, since any substance above ethyl methyl ether in this table has a pressure above 5 atmospheres at the operating temperature of the absorber, which has been assumed to be 140° F.

While the only factors which must be satisfied in selecting a carrier fluid and its antifreezing additive is pressure and temperature, the selection of the additive responsible for the circulation of the carrier fluid requires a third factor which is the amount of additive which can be used without producing dangerously high pressures.

The hydrostatic pressure at the bottom of the solar absorber will be greater than the pressure at the top of the absorber. If the difference in elevation between bottom and top of the absorber is 16 feet, the corresponding pressure differential will be ½ atmosphere. An inspection of Table III indicates a ½ atmosphere difference in pressure between the two columns marked 1 and 2 atmospheres, will increase the boiling temperatures of the compounds listed in column 1 by approximately 15° F., and a smaller but appreciable increase in boiling temperature takes place between the values listed in the two columns marked 2 and 5 atmospheres, for each one half increase in atmospheric pressure.

When the circulation of the carrier fluids depend upon a single additive, the quantity of additive used is not important providing the maximum temperature in the absorber does not become high enough to cause the additive to produce a dangerously high pressure.

An inspection of Table III indicates that when more than one additive is used, the additive which caused the carrier fluid to circulate at the lower temperature must be completely evaporated before the second additive evaporates, otherwise, the vapor pressure of the first additive at the higher temperatures will blow the carrier fluids out of the system. However, the second additive is not critical, since the pressure developed by this additive at the peak temperature in the absorber can be selected so that it does not exceed the safe operating pressure of the system. If three additives are employed, the first two are critical and the third one is not. In general, if n additives are employed the percentage of the first n-1 added are critical and the nth one is not.

Ethyl methyl ether has been selected to illustrate how the calculations must be made for one of the n-1 additives.

To calculate the quantity of ethyl methyl ether which must be added to the carrier fluid to have all the ether in the gaseous state when the temperature throughout the fluids is 80° F. and the pressure 2 atmospheres, it is necessary to know the change in volume which takes place when the additive changes state. An approximation to this change in volume which takes place close enough for all practical purposes, is 125.

The overflow tank 60 in FIG. 6 has a diameter of 9.06 feet and an area of 64.46 ft². The volume of the system was assumed to be 1700 gallons=227 cubic feet. Allowing the 227 cubic feet to undergo a change in volume of 5% when the ethyl methyl ether changes state, this change in volume would be 227×0.05=11.35 cubic feet. This would cause an increase in the liquid height of 11.39/64.46=0.1766 feet=2.12 inches, or a change in the hydrostatic pressure of $(2.12/12 \times 32.2) \times 14.7 = 0.0806$ p.s.i.

The change in volume when the ethyl methyl ether changes from the liquid to the gaseous state is 125, i.e. $V_g/V_e = 125$, where $V_g$ is the volume of the ether in the liquid state and $V_e$ the volume of the vapor. Taking the combined volume of the carrier liquid $V_c$ and the liquid volume of the ether $V_e$ as 1 and after the ether has been converted into the gaseous state the combined volume of the liquid carrier $V_c$ and the gaseous volume 125 $V_e$ of the ether, as 1.05, the following equations may be written:

$$V_c + V_e = 1$$

$$V_c + 125 V_e = 1.05$$

Subtracting and solving for $V_e$, $$V_e = 0.05/125 = 0.0004, \text{ which is } 0.04 \text{ o/o}$$

$$V_c = 0.9996 \text{ which is } 99.96 \text{ o/o},$$

so that by adding 0.0004 unit of $V_e$ by volume to the carrier fluid to form 1 unit of volume, a change in state from liquid to vapor of the ether will produce a volume change of:

$$0.0004 \times 125 \times 100 = 5 \text{ o/o}$$

An inspection of the Table I giving the relative density and volume of water indicates that the 5 o/o change in volume used in these calculations should give the same rate of liquid flow as in a gravity hot water system having a temperature differential of 212° F. between two vertical pipes.

These calculations show that when ethyl methyl ether is mixed with the carrier fluid it must all be evaporated when the average temperature of the carrier fluid is 80° F., otherwise as the temperature increases and excess ether evaporates, the pressure will become dangerously high. If the system is built to withstand 8 atmospheres an excess of ethyl methyl ether may be added and a second substance such as diethylether is not needed, since the sun can not raise the temperature of the fluids above 140° F.

Of course in other locations, such as the deserts, the sun may raise the temperature of the absorber well above 140° F., since this peak temperature is different for different parts of the earth, the additives used in the carrier fluid will, likewise, depend upon the latitude and the terrain.

While the preferred embodiments of the invention have been illustrated in detail, it is apparent that modifications and adaptations are within the spirit and scope of the present invention, as set forth in the appended claims.

What is claimed is:

1. A solar heating system comprising solar collecting means enclosing a heat absorbing medium, fluid storage means communicating with said collecting means; at least one radiator receiving heat from said medium; a heat exchanger connected between said collecting means and said storage means cooperating with the fluid storage to preheat the heat absorbing medium; thermostatically operated valves between said exchanger, said collecting means and said storage means; said medium containing an emulsifier and at least two additives having different boiling points vaporizable at a temperature below the boiling point of said medium to cause flow of said medium through said entire system by gravitational circulation said additives having a combined vapor pressure at their peak operating temperatures which is lower than the safe operating pressure of the system.

2. The system of claim 1, further including a pipe having a lower end and a higher end said lower end communicating with the lowest part of said storage means at its lower part and having an expansion chamber open to the ambient air at its upper part, said pipe having a given height to provide the system pressure which will determine the temperature at which said fluids will vaporize.

3. The system of claim 1, wherein said medium comprises water, a soap and at least two additives of the group of benzene, gasoline, ethanol, methanol, pentane, pentene, and mixtures thereof.

4. The system of claim 1, wherein said heat exchanger comprises a short upper section formed of a material having poor heat conductivity and a longer lower section formed of a material having high heat conductivity, said upper section having a thermostatic valve connected thereto.

5. The system of claim 2, wherein said expansion chamber has a diameter large enough to maintain the hydrostatic head of the fluid in said system to within one foot.

6. The system of claim 1, wherein said radiator is designed and arranged to condense said fluid to the liquid state thus making the density of the medium in said fluid greater than the density of said fluid in said collector means thus causing gravitational force producing circulation through said system.

7. The system of claim 1, further including a fluid pump connected to said radiator to circulate said fluid therein.

8. The system of claim 1, wherein a conventional hot water heater is connected to said system through a thermostat whereby when the temperature drops below a predetermined level, fluid from said collecting means is diverted from said radiator and replaced by fluid from said hot water heater.

9. The system of claim 3, in which the vaporizable additives are present in an amount of five percent of the heat absorbing medium.

* * * * *